United States Patent
Murase et al.

(10) Patent No.: US 10,909,717 B2
(45) Date of Patent: Feb. 2, 2021

(54) VIEWPOINT RECOMMENDATION APPARATUS, RECOMMENDATION METHOD THEREOF, AND NON-TRANSITORY COMPUTER READABLE MEDIUM

(71) Applicants: National University Corporation Nagoya University, Nagoya (JP); Toyota Jidosha Kabushiki Kaisha, Toyota (JP)

(72) Inventors: Hiroshi Murase, Nagoya (JP); Yasutomo Kawanishi, Nagoya (JP); Daisuke Deguchi, Nagoya (JP); Nik Mohd Zarifie bin Hashim, Nagoya (JP); Yusuke Nakano, Nagoya (JP); Norimasa Kobori, Brussels (BE)

(73) Assignees: National University Corporation Nagoya University, Nagoya (JP); Toyota Jidosha Kabushiki Kaisha, Toyota (JP)

( * ) Notice: Subject to any disclaimer, the term of this patent is extended or adjusted under 35 U.S.C. 154(b) by 32 days.

(21) Appl. No.: 16/454,735

(22) Filed: Jun. 27, 2019

(65) Prior Publication Data
US 2020/0005480 A1    Jan. 2, 2020

(30) Foreign Application Priority Data
Jun. 29, 2018  (JP) ................. 2018-125200

(51) Int. Cl.
*G06T 7/70* (2017.01)
*G06T 7/00* (2017.01)
(Continued)

(52) U.S. Cl.
CPC ............... *G06T 7/70* (2017.01); *G06F 17/18* (2013.01); *G06K 9/00523* (2013.01);
(Continued)

(58) Field of Classification Search
CPC ... G06T 7/70; G06T 7/97; G06T 2207/20081; G06N 20/00; G06F 17/18; G06K 9/00523
See application file for complete search history.

(56) References Cited

U.S. PATENT DOCUMENTS 10,171,738 B1 * 1/2019 Liang ..................... G06T 15/20
2005/0031196 A1 * 2/2005 Moghaddam ........... G06T 17/00
                                                            382/154
(Continued)

FOREIGN PATENT DOCUMENTS

JP       2012022411 A    2/2012

*Primary Examiner* — David F Dunphy
(74) *Attorney, Agent, or Firm* — Dinsmore & Shohl LLP

(57) ABSTRACT

A viewpoint recommendation apparatus includes image feature extraction means for extracting an image feature from the acquired image at a first viewpoint, pose estimation means for calculating a first likelihood map indicating a relation between the estimated pose of the object and a likelihood of this estimated pose, second storage means for storing a second likelihood map indicating a relation between the true first viewpoint and a likelihood of this first viewpoint in the estimated pose, third storage means for storing a third likelihood map indicating a relation between the pose of the object when the object is observed at the first and the second viewpoints and a likelihood of this pose, and viewpoint estimation means for estimating the second viewpoint so that a value of an evaluation function of the first, second, and third likelihood maps becomes the maximum or minimum.

10 Claims, 8 Drawing Sheets

(51) Int. Cl.
*G06K 9/00* (2006.01)
*G06N 20/00* (2019.01)
*G06F 17/18* (2006.01)

(52) U.S. Cl.
CPC .............. *G06N 20/00* (2019.01); *G06T 7/97* (2017.01); *G06T 2207/20081* (2013.01)

(56) References Cited

U.S. PATENT DOCUMENTS

| | | | |
|---|---|---|---|
| 2009/0245691 A1* | 10/2009 | Naimark | G06T 19/006 382/285 |
| 2012/0008830 A1 | 1/2012 | Yoshii | |
| 2013/0142390 A1* | 6/2013 | Othmezouri | G06T 7/251 382/103 |
| 2014/0219550 A1* | 8/2014 | Popa | G06K 9/00342 382/154 |
| 2015/0095360 A1* | 4/2015 | Vrcelj | G06F 16/24 707/758 |
| 2018/0311819 A1* | 11/2018 | Thomas | B25J 9/1694 |
| 2019/0279397 A1* | 9/2019 | Moteki | G06T 7/543 |

\* cited by examiner

VIEWPOINT RECOMMENDATION APPARATUS, RECOMMENDATION METHOD THEREOF, AND NON-TRANSITORY COMPUTER READABLE MEDIUM

CROSS REFERENCE TO RELATED APPLICATIONS

This application is based upon and claims the benefit of priority from Japanese patent application No. 2018-125200, filed on Jun. 29, 2018, the disclosure of which is incorporated herein in its entirety by reference.

BACKGROUND

The present disclosure relates to a viewpoint recommendation apparatus for estimating a viewpoint of an object, a recommendation method thereof, and a program.

An object pose estimation apparatus that observes an object at a plurality of viewpoints is known (see, for example, Japanese Unexamined Patent Application Publication No. 2012-022411).

Since the object pose estimation apparatus observes the object at a plurality of randomly set viewpoints, these viewpoints are not necessarily the optimum positions for observing the object.

SUMMARY

The present disclosure has been made to solve such a problem. A main object of the present disclosure is to provide a viewpoint recommendation apparatus that can estimate an optimum viewpoint of an object, a recommendation method thereof, and a program.

An example aspect of the present disclosure to achieve the above objective is a viewpoint recommendation apparatus for estimating, from a first viewpoint of an object, a second viewpoint at which the object is to be observed next in order to estimate a pose of the object. The viewpoint recommendation apparatus includes: image acquisition means for acquiring an image of the object at the first viewpoint; image feature extraction means for extracting an image feature of the image of the object from the image of the object acquired by the image acquisition means; pose estimation means for calculating a first likelihood map indicating a relation between the estimated pose of the object estimated from the image of the object and a likelihood of this estimated pose based on the image feature of the object extracted by the image feature extraction means; second storage means for storing a second likelihood map indicating a relation between the true first viewpoint in the estimated pose and a likelihood of this first viewpoint; third storage means for storing a third likelihood map indicating a relation between the pose of the object when the object is observed at the first viewpoint and the second viewpoint and a likelihood of this pose; and viewpoint estimation means for estimating the second viewpoint so that a value of an evaluation function becomes the maximum or minimum, the evaluation function using, as a parameter, a result of multiplying and integrating the first likelihood map calculated by the pose estimation means, the second likelihood map stored in the second storage means, and the third likelihood map stored in the third storage means.

In this example aspect, the viewpoint estimation means may estimate the second viewpoint $\hat{\delta}_2$ using the following formula based on the first likelihood map $p(\xi|I_1)$ estimated by the pose estimation means, the second likelihood map $p(\varphi_1|\xi)$ stored in the second storage means, and the third likelihood map $p(\theta|\delta_2, \varphi_1)$ stored in the third storage means. In this formula, $\xi$ is the estimated pose of the object, $I_1$ is the image of the object acquired by the image acquisition means at the first viewpoint, $\varphi_1$ is the first viewpoint, $\theta$ is the pose of the object, and $\delta_2$ is the rotation degree to the second viewpoint.

In this example aspect, first learning means for learning the image feature of each pose of the object is further included. The pose estimation means may compare the image feature of the object extracted by the image feature extraction means with the image feature of each pose of the object learned by the first learning means to calculate the first likelihood map.

In this example aspect, the second storage means may be second learning means which learns a relation between the true first viewpoint in the estimated pose and the likelihood of the true first viewpoint and store it as the second likelihood map.

In this example aspect, the third storage means may be third learning means which learns a relation between the pose of the object when the object is observed at the first viewpoint and the second viewpoint and a likelihood of this pose and store it as the third likelihood map.

In this example aspect, the evaluation function may be a function for calculating a variance of a distribution or an entropy of the distribution.

In this example aspect, the viewpoint estimation means may estimate at least one of the second viewpoint so that the value of the evaluation function becomes greater than or equal to a threshold or less than or equal to the threshold.

Another example aspect of the present disclosure to achieve the above object may be a recommendation method performed by a viewpoint recommendation apparatus for estimating, from a first viewpoint of an object, a second viewpoint at which the object is to be observed next in order to estimate a pose of the object. The recommendation method includes: acquiring an image of the object at the first viewpoint; extracting an image feature of the image of the object from the acquired image of the object; calculating a first likelihood map indicating a relation between the estimated pose of the object estimated from the image of the object and a likelihood of this estimated pose based on the extracted image feature of the object; estimating the second viewpoint so that a value of an evaluation function becomes the maximum or minimum, the evaluation function using, as a parameter, a result of multiplying and integrating the calculated first likelihood map, a second likelihood map indicating a relation between the true first viewpoint in the estimated pose and a likelihood of this first viewpoint, and a third likelihood map indicating a relation between the pose of the object when the object is observed at the first viewpoint and the second viewpoint and a likelihood of this pose.

Another example aspect of the present disclosure to achieve the above object may be a program of a viewpoint recommendation apparatus for estimating, from a first viewpoint of an object, a second viewpoint at which the object is to be observed next in order to estimate a pose of the object. The program causes a computer to execute: a process of acquiring an image of the object at the first viewpoint; a process of extracting an image feature of the image of the object from the acquired image of the object; a process of calculating a first likelihood map indicating a relation between the estimated pose of the object estimated from the image of the object and a likelihood of this estimated pose based on the extracted image feature of the object; and a process of estimating the second viewpoint so that a value of an evaluation function becomes the maximum or minimum, the evaluation function using, as a parameter, a result of multiplying and integrating the calculated first likelihood map, a second likelihood map indicating a relation between the true first viewpoint in the estimated pose and a likelihood of this first viewpoint, and a third likelihood map indicating a relation between the pose of the object when the object is observed at the first viewpoint and the second viewpoint and a likelihood of this pose.

The present disclosure has been made to solve such a problem and can provide a viewpoint recommendation apparatus that can estimate an optimum viewpoint of an object, a recommendation method thereof, and a program.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, an embodiment of the present disclosure is explained with reference to the drawings.

It is important to estimate a pose of an unknown object, for example, in order for a life support robot to hold the object and move. Such a robot can estimate the pose of the object with high accuracy by observing the object at a plurality of viewpoints by a sensor such as a camera.

However, when the object is observed at a plurality of randomly set viewpoints, these viewpoints are not necessarily the optimal positions for observing the object. For example, it is difficult to recognize the object depending on the viewpoint, and thus there could be a problem, for example, the recognition accuracy degrades.

On the other hand, the viewpoint recommendation apparatus according to the embodiment of the present disclosure estimates, from a first viewpoint at which the object is observed first, an optimal second viewpoint at which the object is to be observed next. By doing so, it is possible to estimate the optimum viewpoint of the object, and when the object is observed at the optimum viewpoint, the pose of the object can be estimated with high accuracy.

Figure 1:
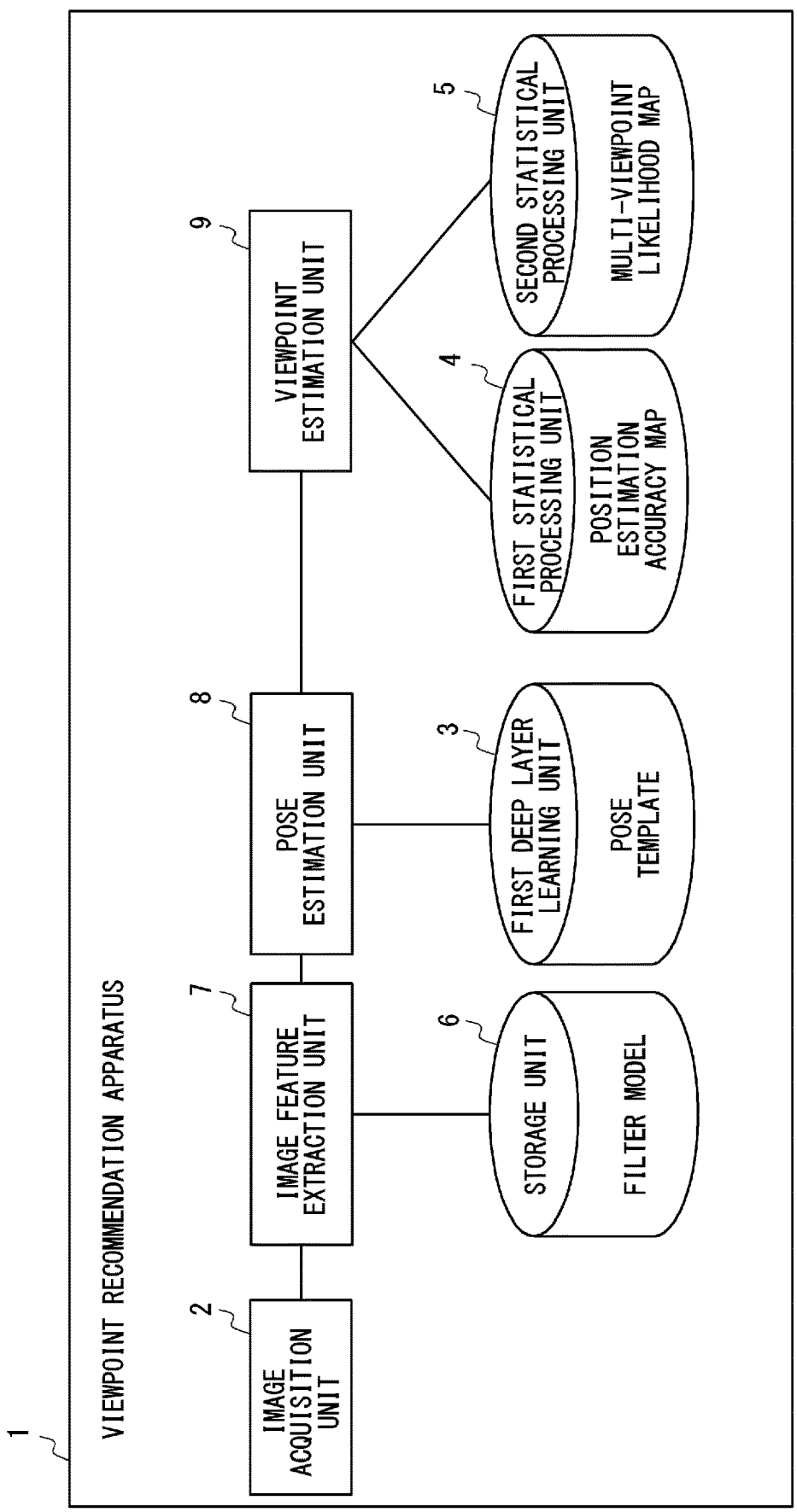
FIG. 1 is a block diagram showing a schematic system configuration of a viewpoint recommendation apparatus according to an embodiment of the present disclosure.

FIG. 1 is a block diagram showing a schematic system configuration of the viewpoint estimating apparatus according to this embodiment. The viewpoint recommendation apparatus 1 according to this embodiment includes an image acquisition unit 2, a first deep layer learning unit 3, first and second statistical processing units 4 and 5, a storage unit 6, an image feature extraction unit 7, a pose estimation unit 8, and a viewpoint estimation unit 9.

Note that a main hardware configuration of the viewpoint recommendation apparatus 1 includes a microcomputer composed of, for example, a CPU (Central Processing Unit) that performs calculation processing, etc., a memory composed of a ROM (Read Only Memory) and a RAM (Random Access Memory) storing a calculation program, etc. executed by the CPU, an interface unit (I/F) that inputs and outputs signals to and from the outside. The CPU, the memory, and the interface unit are connected to one another through a data bus or the like.

The image acquisition unit 2 is a specific example of image acquisition means. The image acquisition unit 2 acquires an image of the object in chronological order at the first viewpoint. The image acquisition unit 2 is composed of, for example, a distance sensor such as an RGB camera, an infrared camera or the like, but is not limited to this. The image acquisition unit 2 may be composed of any sensor as long as it can acquire an image of the object. The image acquisition unit 2 outputs the image of the object acquired at the first viewpoint to the image feature extraction unit 7.

The first deep layer learning unit 3 is a specific example of first learning means. The first and second statistical processing units 4 and 5 are specific examples of second and third learning means, respectively. The first deep layer learning unit 3 is composed of a neural network such as CNN (Convolutional Neural Network), RNN (Recurrent Neural Network), etc. This RNN includes an LSTM (Long Short Term Memory) as an intermediate layer.

Each of the first deep layer learning unit 3 and the first and second statistical processing units 4 and 5 may be composed of a learning device such as an SVM (Support Vector Machine). The first deep layer learning unit 3, the first and second statistical processing units 4 and 5, and the storage unit 6 may be integrally configured. The first deep layer learning unit 3 learns the relationship between image features of each pose of the object using a plurality of sets of images of the object and learning data of the pose of the object and stores a result of the learning (a pose template).

The image feature extraction unit 7 is a specific example of image feature extraction means. The image feature extraction unit 7 uses a filter model stored in the storage unit 6 to extract the image feature of the image of the object from the image of the object acquired by the image acquisition unit 2. The filter model includes, for example, a base vector for dimensional compression by PCA (Principal Component Analysis), LDA (Linear Discriminant Analysis), etc., a differentiation filter for extracting an edge, and a local filter such as a discrete cosine transform, etc.

The image feature extraction unit 7 may automatically extract the image feature of the object from the image of the object acquired by the image acquisition unit 2 using the deep learning unit. In this case, the deep learning unit learns the image feature favorable for recognition using the learning data in advance. The image feature extraction unit 7 outputs the extracted image feature of the image of the object to the pose estimation unit 8.

The pose estimation unit 8 is a specific example of pose estimation means. The pose estimation unit 8 compares the image feature of the object extracted by the image feature extraction unit 7 with the image feature (the pose template) of each pose learned in advance by the first deep learning unit 3 to calculate a likelihood of the pose of the object. Then, the pose estimation unit 8 calculates an estimated pose likelihood map with three axes (x axis, y axis, and z axis) of the pose of the object. Note that the pose estimation unit 8 compares the image feature of the object extracted by the image feature extraction unit 7 with the image feature of each pose of the object stored in advance in the storage unit 6 to calculate the estimated pose likelihood map.

The estimated pose likelihood map is one specific example of a first likelihood map. The estimated pose likelihood map is, for example, map information indicating a relation between the estimated pose (an estimated angle) $\xi$ of the object and a likelihood $p(\xi|I_1)$ of this estimated pose. $I_1$ is an image of the object acquired by the image acquisition unit 2 at the first viewpoint.

Figure 2:
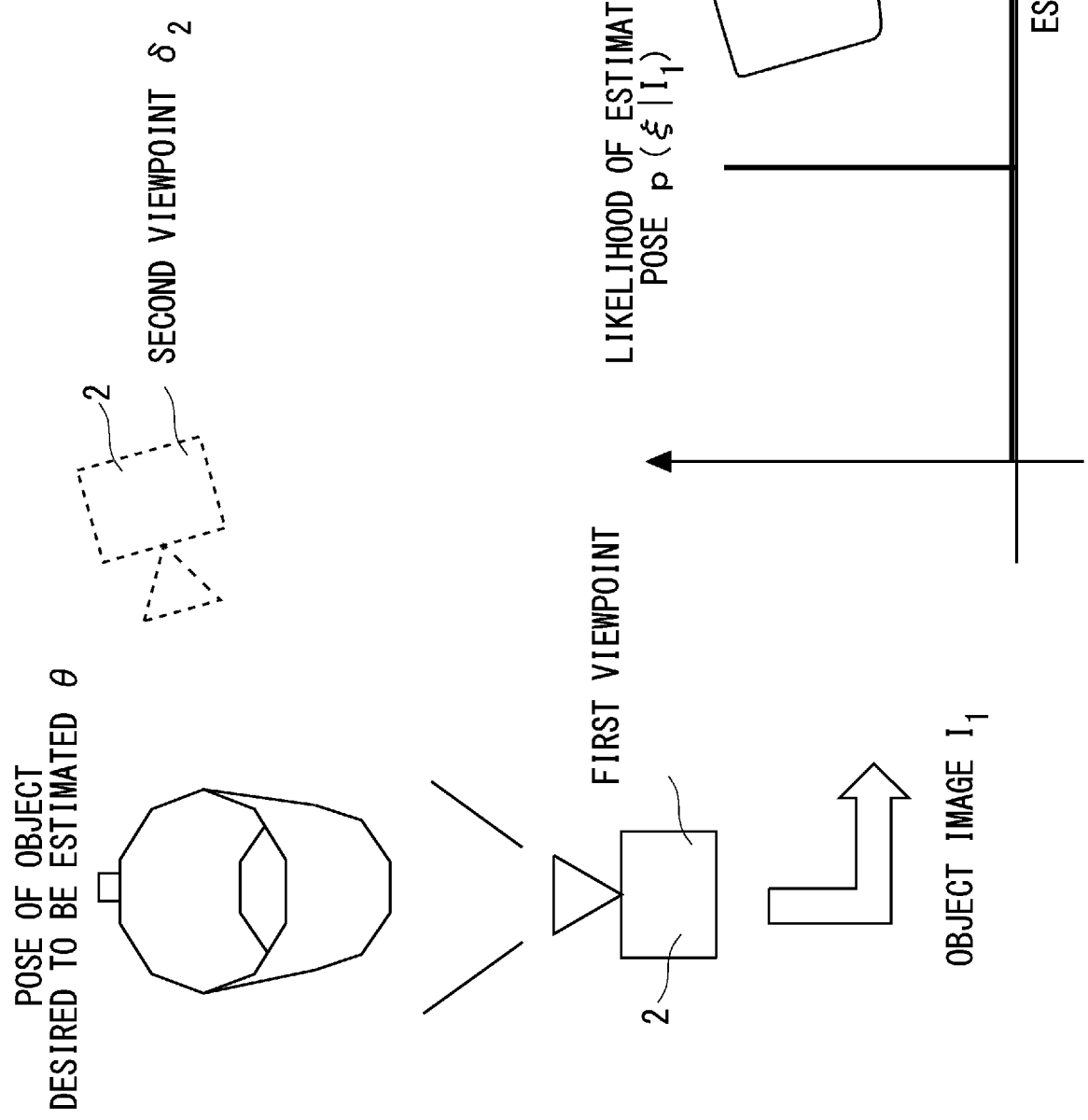
FIG. 2 is a view showing an example of an estimated pose likelihood map.

FIG. 2 is a view showing an example of the estimated pose likelihood map. In FIG. 2, the horizontal axis represents the estimated pose $\xi$ of the object, and the vertical axis the likelihood $p(\xi|I_1)$ of the estimated pose. The likelihood $p(\xi|I_1)$ indicates a likelihood distribution of the estimated pose $\xi$ of the object estimated from the image $I_1$ of the object. When the pose estimation unit 8 is configured to perform, for example, a regression analysis, the estimated pose likelihood map has a distribution as shown in FIG. 2 in which there is only one point of 1, and the rest of the points are 0. The pose estimation unit 8 outputs the calculated estimated pose likelihood map to the viewpoint estimation unit 9.

The viewpoint estimation unit 9 is a specific example of viewpoint estimation means. The viewpoint estimation unit 9 estimates the next second viewpoint of the image acquisition unit 2 based on the estimated pose likelihood map calculated by the pose estimation unit 8.

Figure 3:
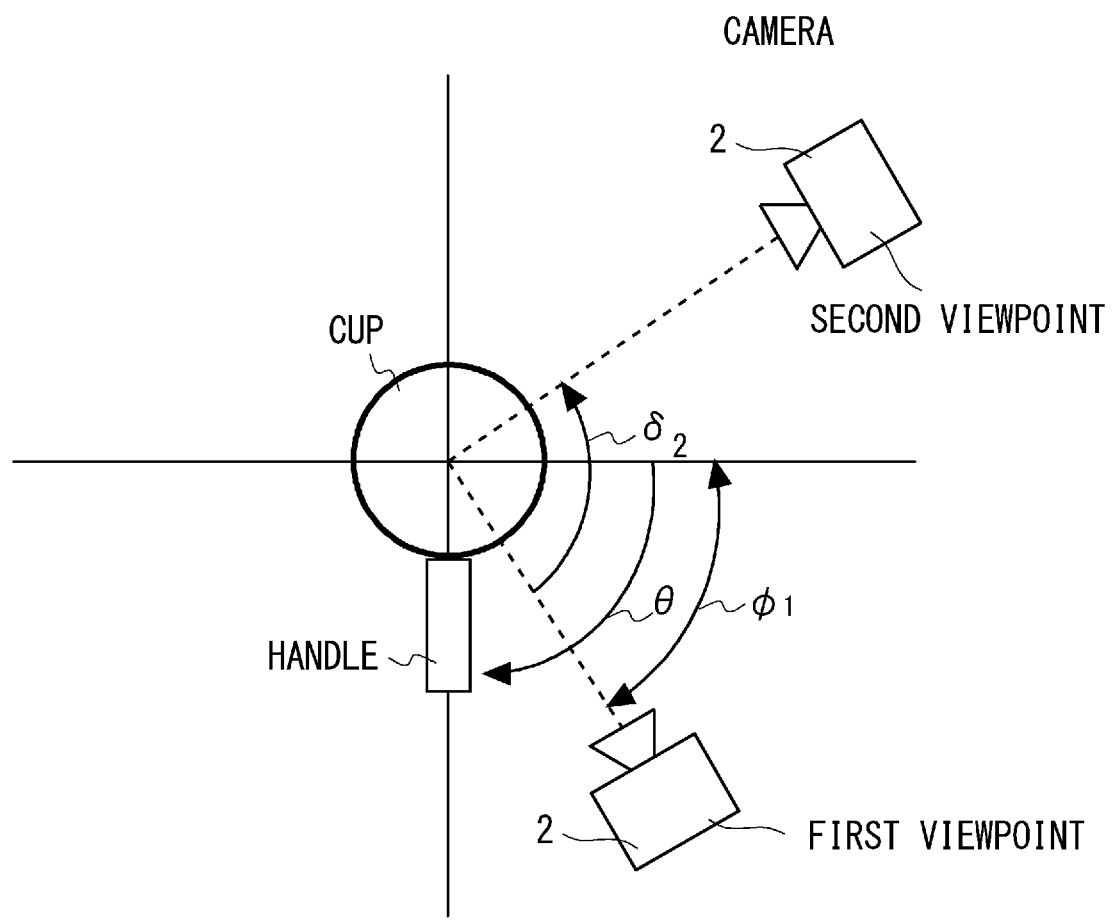
FIG. 3 is a view of a cup with a handle placed on a flat surface viewed from above.

Here, a cup with a handle is explained as an example of the object. FIG. 3 is a view of the cup with the handle placed on a flat surface viewed from above. For example, as shown in FIG. 3, the first viewpoint can be expressed as a rotation angle $\varphi_1$ of a two-dimensional coordinate system with the cup as the center thereof. The second viewpoint can be expressed as an amount of a movement (a rotation amount) $\delta_2$ of the image acquisition unit 2 from the first viewpoint. The pose of the cup can be expressed as the rotation angle $\theta$ of the handle around an origin. For both of the viewpoints, the counterclockwise direction is positive.

Note that in this embodiment, the second viewpoint is expressed as an amount of a movement from the first viewpoint, but the present disclosure is not limited to this. For example, like the first viewpoint $\varphi_1$, the second viewpoint may be expressed as the rotation angle $\varphi_2$.

Figure 4:
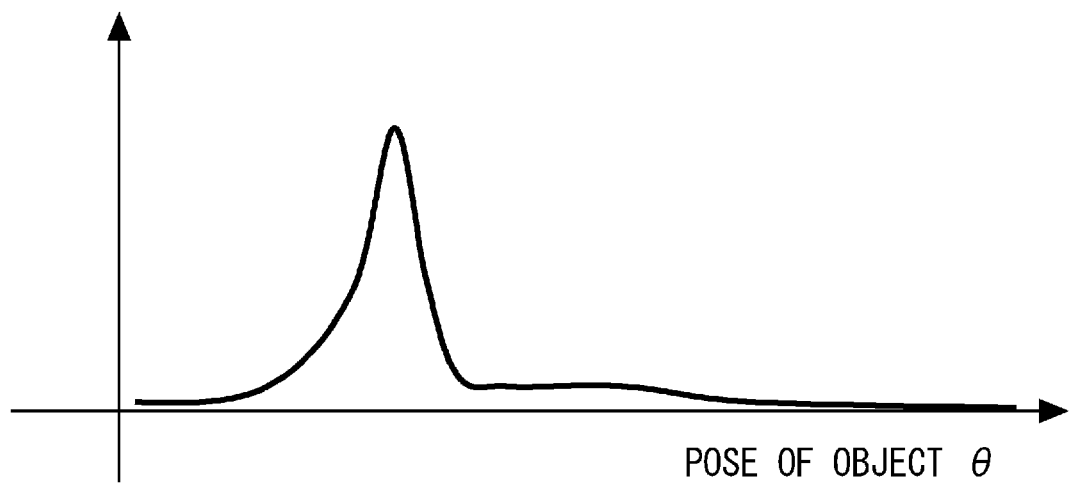
FIG. 4 is a view showing an example of a pose likelihood map showing a distribution of likelihoods of a pose of an object.

FIG. 4 is a view showing an example of the pose likelihood map showing the distribution of the likelihoods of the pose of the object. In FIG. 4, the horizontal axis represents the pose $\theta$ of the object, and the vertical axis represents the likelihood $p(\theta|\delta_2, I_1)$ of this pose.

The viewpoint estimation unit 9 estimates the next second viewpoint $\hat{\delta}_2$ (hat) by evaluating whether the pose likelihood map of the object shown in FIG. 4 is favorable using an evaluation function $g(\cdot)$. For example, the viewpoint estimation unit 9 evaluates the pose likelihood map using the evaluation function $g(\cdot)$, and calculates at least one second viewpoint $\delta_2$ such that the kurtosis of the pose likelihood map becomes larger. Thus, it is possible to estimate the optimum second viewpoint at which the likelihood of the pose of the object becomes higher. Then, by observing the object at the estimated second viewpoint, the pose of the object can be estimated with high accuracy.

The evaluation function $g(\cdot)$ is, for example, a function formula (1) for calculating the variance of the pose likelihood map, and a function formula (2) for calculating the entropy of the pose likelihood map. The kurtosis of the pose likelihood map can be optimally evaluated by using these evaluation functions.

[Formula 1]

$$g(p) = \frac{\int x^2 P(x)dx}{\int p(x)dx} - \left(\frac{\int xp(x)dx}{\int p(x)dx}\right)^2 \quad (1)$$

$$g(p) = \int -p(x)\log p(x)dx \quad (2)$$

Note that the above evaluation function is merely an example, and any function can be employed as long as it can evaluate the kurtosis of the pose likelihood map.

For example, when the value of the evaluation function $g(\cdot)$ of the formula (1) or (2) is the minimum, the kurtosis of the pose likelihood map becomes the maximum. Thus, the viewpoint estimation unit 9 estimates the next second viewpoint $\hat{\delta}_2$ (hat) using the following formula (3). In the following formula (3), $\hat{\delta}_2$ (hat) is indicated by adding a hat symbol over $\delta_2$.

[Formula 2]

$$\hat{\delta}_2 = \mathrm{argmin}_{\delta_2} g(p(\theta|\delta_2, I_1)) \quad (3)$$

The viewpoint estimation unit 9 uses the above formula (3) to estimate the second viewpoint $\hat{\delta}_2$ (hat) such that the value of the evaluation function $g(p(\theta|\delta_2, I_1))$ becomes the minimum and the kurtosis of the pose likelihood map becomes the maximum.

The viewpoint estimation unit 9 may estimate at least one second viewpoint $\hat{\delta}_2$ (hat) such that the value of the evaluation function $g(p(\theta|\delta_2, I_1))$ becomes less than or equal to a threshold using the above formula (3). Then, at least one second viewpoint $\delta_2$ at which the likelihood of the pose of the object becomes high can be estimated.

When the positive and negative signs of the above evaluation function are reversed, the viewpoint estimation unit 9 may estimate the second viewpoint $\hat{\delta}_2$ (hat) at which the evaluation function $g(p(\theta|\delta_2, I_1))$ becomes the maximum. Further, the viewpoint estimation unit 9 may estimate at least one second viewpoint $\hat{\delta}_2$ (hat) such that the value of the evaluation function $g(p(\theta|\delta_2, I_1))$ becomes larger than or equal to the threshold according to the type of the evaluation function.

Here, latent variables are introduced in $p(\theta|\delta_2, I_1)$ in the above formula (1), and the formula (1) is transformed by multiplying and integrating $p(\theta|\delta_2, I_1)$, $p(\varphi_1|\xi)$, and $p(\xi|I_1)$ like in the following formula (4).

[Formula 3]

$$p(\theta|\delta_2, I_1) = \int p(\theta|\delta_2, \varnothing_1) p(\varnothing_1|I_1) d\varnothing_1 = \iint p(\theta|\delta_2, \varnothing_1) p(\varnothing_1|\xi) p(\xi|I_1) d\xi d\varnothing_1 \quad (4)$$

As described above, $p(\xi|I_1)$ in the formula (4) is an estimated pose likelihood map output from the pose estimation unit 8. The estimated pose likelihood map is one specific example of the second likelihood map. In the formula (4), $p(\varphi_1|\xi)$ is a estimated position accuracy map indicating a relation between the true first viewpoint $\varphi_1$ and the likelihood $p(\varphi_1|\xi)$ of this first viewpoint when the object is in the estimated pose $\xi$.

Figure 5:
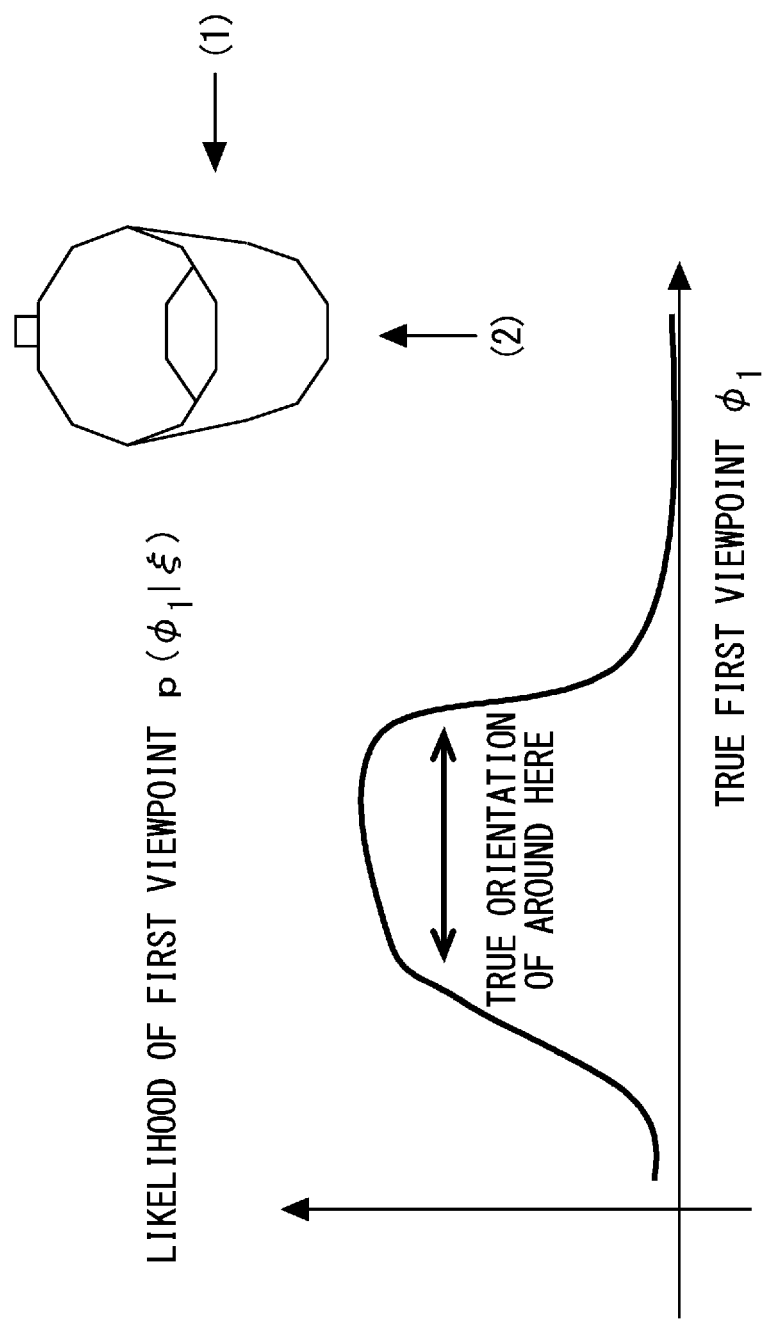
FIG. 5 is a view showing an example of a estimated position accuracy map.

The estimated position accuracy map indicates the estimation accuracy of the pose estimation unit 8 when the image features of the object in the same pose are input to the pose estimation unit 8, and indicates an error distribution for each pose of the object. The estimated position accuracy map is prepared in advance as pairs of true values of the first viewpoints and likelihoods thereof for the object in various poses and for various objects within the same category. FIG. 5 is a view showing an example of the estimated position accuracy map. In FIG. 5, the horizontal axis represents the true first viewpoint $\varphi_1$, and the vertical axis represents the likelihood $p(\varphi_1|\xi)$ of this first viewpoint.

For example, when a cup is viewed from the direction of (1), the position of the handle can be identified, and the pose of the cup can be accurately estimated. Thus, the likelihood of the first viewpoint is high. On the other hand, when the cup is viewed from the direction of (2), the position of the handle cannot be identified, and it is difficult to identify the pose of the cup. Thus, the likelihood of the first viewpoint is low.

The first statistical processing unit 4 learns the relation between the true first viewpoint $\varphi_1$ and the likelihood $p(\varphi_1|\xi)$ of this first viewpoint when the object is in the estimated pose $\xi$, and stores the relation as the estimated position accuracy map. For example, in an object coordinate system, pose estimation is performed on the known image $I_1$ at the first viewpoint $\varphi_{1i}$ and the estimated pose $\xi$ is obtained. The first statistical processing unit 4 learns a correspondence relation between the first viewpoint $\varphi_{1i}$ and the estimated pose $\xi$ using the data of the plurality of sets of the first viewpoint $\varphi_{1i}$ and the estimated pose $\xi$ obtained in the manner described above, estimates probability density, and generates the estimated position accuracy map.

In the formula (4), $p(\theta|\delta_1, \varphi_1)$ is a multi-viewpoint likelihood map indicating a relation between the pose $\theta$ of the object when the object is observed at the first viewpoint $\varphi_1$ and the second viewpoint (the amount of the movement) $\delta_2$ and the likelihood $p(\theta|\delta_2, \varphi_1)$ of this pose. The multi-viewpoint likelihood map is one specific example of a third likelihood map. The multi-viewpoint likelihood map may be expressed by a set of three quaternions of $(\varphi_1, \delta_2, \theta)$.

Figure 6:
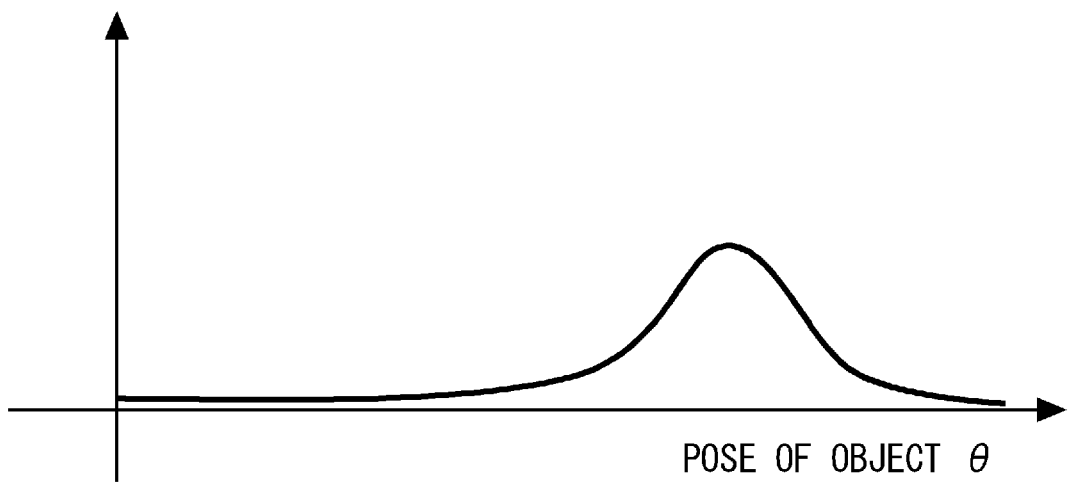
FIG. 6 is a view showing an example of a multi-viewpoint likelihood map.

FIG. 6 is a view showing an example of the multi-viewpoint likelihood map. In FIG. 6, the horizontal axis represents the pose $\theta$ of the object, and the vertical axis represents the likelihood $p(\theta|\delta_2, \varphi_1)$ of the pose of this object when the object is observed at the first viewpoint $\varphi_1$ and the second viewpoint $\delta_2$.

The second statistical processing unit 5 learns the relation between the pose $\theta$ of the object when the object is observed at the first viewpoint $\varphi_1$ and the second viewpoint $\delta_2$ and the likelihood $p(\theta|\delta_2, \varphi_1)$ of this pose, and stores it as the multi-viewpoint likelihood map.

For example, the second statistical processing unit 5 learns the multi-viewpoint likelihood map $p(\theta|\delta_2, \varphi_1)$ after the image acquisition unit 2 is moved to the second viewpoint based on the true pose $\theta$ of the object observed at the first viewpoint $\varphi_{1i}$ and the second viewpoint (the amount of the movement) $\delta_2$. The second statistical processing unit 5 calculates the multi-viewpoint likelihood map by shifting and superimposing $p(\xi|\varphi_1)$ and $p(\xi|\varphi_1+\delta_2)$ in consideration of the amount of the movement $\delta_2$.

In this embodiment, it is estimated how much to move the image acquisition unit 2 from the first viewpoint $\varphi_1$ when the object is viewed from the first viewpoint $\varphi_1$, i.e., the second viewpoint (the amount of the movement) $\delta_2$ is estimated. First, the pose $\xi$ of the object at the first viewpoint $\varphi_1$ is estimated with the image $I_1$, and this estimated pose $\xi$ is expressed as the estimated pose likelihood map $p(\xi|I_1)$. Since it is unknown whether this estimated pose $\xi$ is correct, the estimated position accuracy map $p(\varphi_1|\xi)$ shows how accurate this estimated pose is. Furthermore, the multi-viewpoint likelihood map $p(\theta|\delta_2, \varphi_1)$ represents how accurate the pose of the object is when the first viewpoint $\varphi_1$ and a certain second viewpoint $\delta_2$ are given. By multiplying and integrating these likelihood maps, it is possible to cover every pattern and express the likelihood $p(\theta|\delta_2, I_1)$ of the pose of the object.

In particular, the first viewpoint $\varphi_1$ is introduced by transforming the above formula (4). The first viewpoint $\varphi_1$ is expressed as a likelihood because it is unknown. The second viewpoint is set according to the first viewpoint $\varphi_1$, the value of the evaluation function is evaluated, and thus the optimum second viewpoint can be calculated. By observing the object at the calculated optimum second viewpoint, it is possible to estimate the pose of the object with high accuracy.

In this embodiment, as described above, the viewpoint estimation unit 9 estimates the second viewpoint $\delta_2$ (hat) so that the value of the evaluation function $g(\cdot)$ becomes the minimum. The evaluation function $g(\cdot)$ here uses, as a parameter, a result of multiplying and integrating the estimated pose likelihood map $p(\xi|I_1)$ calculated by the pose estimation unit 8, the estimated position accuracy map $p(\varphi_1|\xi)$ learned by the first statistical processing unit 4, and the multi-viewpoint likelihood map $p(\theta|\delta_2, \varphi_1)$ learned by the second statistical processing unit 5.

Then, as described above, a result of multiplying and integrating the estimated pose likelihood map $p(\xi|I_1)$ calculated by the pose estimation unit 8, the estimated position accuracy map $p(\varphi_1|\xi)$ learned by the first statistical processing unit 4, and the multi-viewpoint likelihood map $p(\theta|\delta_2, \varphi_1)$ learned by the second statistical processing unit 5 indicates the likelihood of the pose $\theta$ of the object. Therefore, by estimating the second viewpoint $\delta_2$ so that the value of the evaluation function $g(\cdot)$ becomes the minimum, i.e., so that the kurtosis of the likelihood distribution of the pose $\theta$ of the object becomes the maximum, it is possible to estimate the pose of the object with high accuracy.

For example, the viewpoint estimation unit 9 estimates the second viewpoint $\delta_2$ (hat) using the following formula (5) based on the estimated pose likelihood map $p(\xi|I_1)$ from the pose estimation unit 8, the estimated position accuracy map $p(\varphi_1|\xi)$ learned by the first statistical processing unit 4, and the multi-viewpoint likelihood map $p(\theta|\delta_2, \varphi_1)$ learned by the second statistical processing unit 5.

[Formula 4]

$$\hat{\delta}_2 = \mathrm{argmin}_{\delta_2} g(\iint p(\theta|\delta_2, \varnothing_1) p(\varnothing_1|\xi) p(\xi|I_1) d\xi d\varnothing_1) \qquad (5)$$

The estimated position accuracy map $p(\varphi_1|\xi)$ and the multi-viewpoint likelihood map $p(\theta|\delta_2, \varphi_1)$ may be stored in advance in the storage unit 6. In this case, the viewpoint estimation unit 9 estimates the second viewpoint $\delta_2$ (hat) based on the estimated pose likelihood map $p(\xi|I_1)$ from the pose estimation unit 8, and the estimated position accuracy map $p(\varphi_1|\xi)$ and the multi-viewpoint likelihood map $p(\theta|\delta_2, \varphi_1)$ stored in the storage unit 6.

The viewpoint estimation unit 9 may calculate a function $f(\delta_2 = f(\xi))$ indicating the relation between the estimated pose $\xi$ of the object and the estimated second viewpoint $\beta_2$. The function (map) f calculates the second viewpoint $\delta_2$ at which $g(p(\theta|\delta_2, \varphi_1))$ is maximized or minimized in the estimated pose $\xi$. The viewpoint estimation unit 9 calculates $\delta_2=f(\xi)$ based on the estimated pose $\xi$ of the object to calculate the second viewpoint $\delta_2$. Then, the second viewpoint $\delta_2$ for the estimated pose $\xi$ of the object can be easily estimated.

Figure 7:
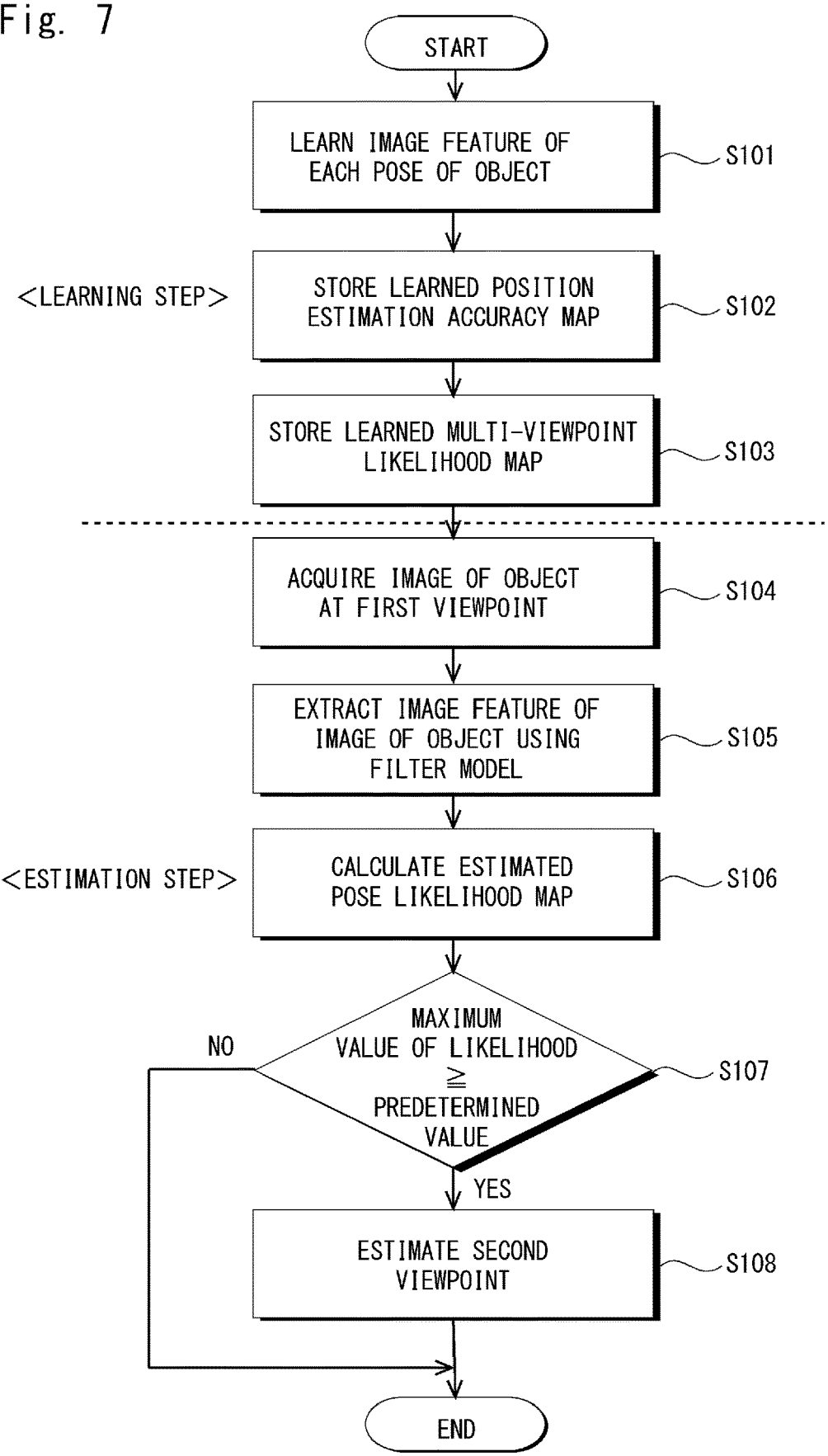
FIG. 7 is a flowchart showing an example of a flow of a recommendation method performed by a viewpoint recommendation apparatus according to the embodiment of the present disclosure.

Next, a recommendation method performed by the viewpoint recommendation apparatus 1 according to this embodiment is explained in detail. FIG. 7 is a flowchart showing an example of a flow of the recommendation method performed by the viewpoint recommendation apparatus according to this embodiment.

In the recommendation method performed by the viewpoint recommendation apparatus 1 according to this embodiment, firstly, in a preliminary process, a learning step of learning the image feature in object recognition, the estimated position accuracy map, and the multi-viewpoint likelihood map is executed, and then an estimation step of estimating the second viewpoint using a result of the learning is executed. Firstly, the learning step is explained.

<Learning Step>

The first deep layer learning unit 3 learns the image feature of each pose of the object using a plurality of sets of images of the object and learning data of the pose of the object (Step S101).

The first statistical processing unit 4 learns the relation between the true first viewpoint $\varphi_1$ and the likelihood $p(\varphi_1|\xi)$ of this first viewpoint in the estimated pose $\xi$, and stores a result of the learning as the estimated position accuracy map (Step S102).

The second statistical processing unit 5 learns the relation between the pose $\theta$ of the object when the object is observed at the first viewpoint $\varphi_1$ and the second viewpoint $\delta_2$ and the likelihood $p(\theta|\delta_2, \varphi_1)$ of this pose, and stores a result of the learning as the multi-viewpoint likelihood map (Step S103).

<Estimation Step>

Next, the estimation step is explained. The image acquisition unit 2 acquires an image of the object at the first viewpoint (Step S104). The image acquisition unit 2 outputs the acquired image of the object to the image feature extraction unit 7.

The image feature extraction unit 7 extracts the image feature of the object from the image of the object output from the image acquisition unit 2 using the filter model stored in the storage unit 6 (Step S105). The image feature extraction unit 7 outputs the extracted image feature of the object to the pose estimation unit 8.

The pose estimation unit 8 compares the image feature of the object extracted by the image feature extraction unit 7 with the image feature of each pose learned in advance by the first deep learning unit 3, and calculates the likelihood of the pose of the object to calculate the estimated pose likelihood map (Step S106). The pose estimation unit 8 outputs the calculated estimated pose likelihood map to the viewpoint estimation unit 9.

The viewpoint estimation unit 9 determines whether a maximum value of the likelihood of the estimated pose is greater than or equal to a predetermined value based on the estimated pose likelihood map from the pose estimation unit 8 (Step S107). Note that the predetermined value is previously set in, for example, the storage unit 6. The predetermined value is set, for example, based on the estimation accuracy of the desired robot pose.

When the viewpoint estimation unit 9 determines that the maximum value of the likelihood of the estimated pose is greater than or equal to the predetermined value (YES in Step S107), it estimates the second viewpoint 62 using the following formula (5) based on the estimated pose likelihood map from the pose estimation unit 8, the estimated position accuracy map learned by the first statistical processing unit 4, and the multi-viewpoint likelihood map learned by the second statistical processing unit 5 (Step S108).

When the viewpoint estimation unit 9 determines that the maximum value of the likelihood of the estimated pose is not greater than or equal to the predetermined value (NO in Step S107), it ends this process. In this case, since the optimum second viewpoint cannot be estimated at this first viewpoint, it is necessary to move the image acquisition unit 2 to a position where it is easy to observe the object.

Figure 8:
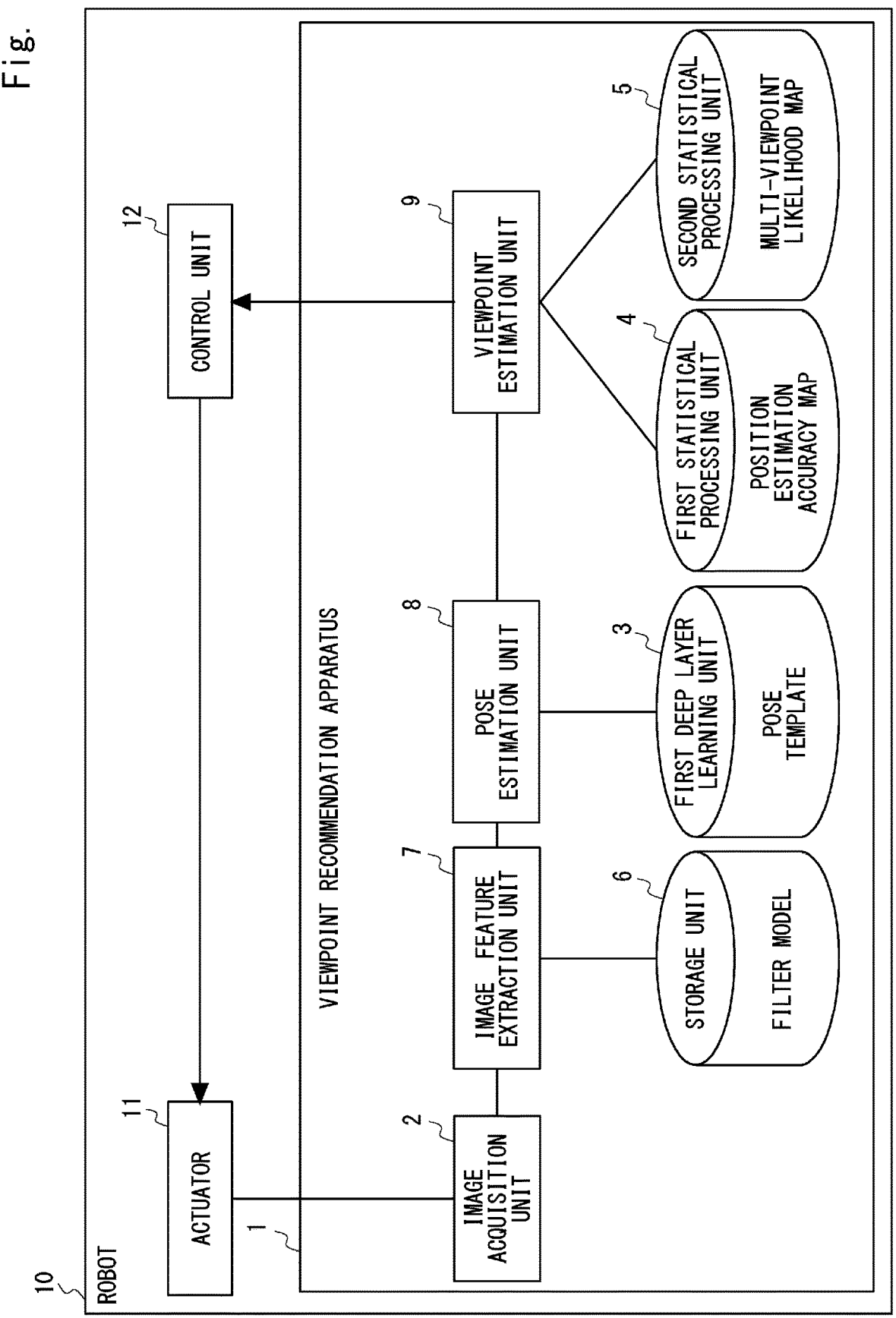
FIG. 8 is a block diagram showing a schematic system configuration of a robot on which the viewpoint recommendation apparatus according to the embodiment of the present disclosure is mounted.

For example, the viewpoint recommendation apparatus 1 according to this embodiment may be mounted on, for example, an autonomous mobile robot. FIG. 8 is a block diagram showing a schematic system configuration of a robot on which the viewpoint recommendation apparatus 1 according to this embodiment is mounted.

The image acquisition unit 2 is provided on the robot 10's head or the like. The robot 10 is configured as, for example, an articulated humanoid robot. An actuator 11 such as a servomotor is provided at each joint of the robot 10. The control unit 12 can move the image acquisition unit 2 to a desired position by controlling the actuators 11 of the respective joints to drive the respective joints.

The viewpoint estimation unit 9 outputs the estimated second viewpoint 62 to the control unit 12. The control unit 12 controls each actuator 11 to move the image acquisition unit 2 from the first viewpoint 91 to the second viewpoint 52 estimated by the viewpoint estimation unit 9 based on the second viewpoint 62 from the viewpoint estimation unit 9. The image acquisition unit 2 acquires an image of the object at the moved second viewpoint.

The viewpoint recommendation apparatus 1 may be configured not to be mounted on the robot 10. In this case, the viewpoint recommendation apparatus 1 is connected to the robot 10 wirelessly or via a wire. The viewpoint estimation unit 9 transmits the estimated second viewpoint $\delta_2$ to the control unit 12 via radio such as Bluetooth (registered trademark), and Wifi (registered trademark).

As described above, in this embodiment, the second viewpoint 62 is estimated so that the value of the evaluation function g(•) becomes the maximum or the minimum. The evaluation function g(•) here uses, as a parameter, a result of multiplying and integrating the estimated pose likelihood map $p(\xi|I_1)$ calculated by the pose estimation unit 8, the estimated position accuracy map $p(\varphi_1|\xi)$ learned by the first statistical processing unit 4, and the multi-viewpoint likelihood map $p(\theta|\delta_2, \varphi_1)$ learned by the second statistical processing unit 5.

Therefore, by estimating the second viewpoint $\delta_2$ so that the value of the evaluation function g(•) becomes the maximum or the minimum, i.e., so that the kurtosis of the likelihood distribution of the pose $\theta$ of the object becomes the maximum, it is possible to estimate the pose of the object with high accuracy.

Although some embodiments of the present disclosure have been described, these embodiments have been presented merely as examples and are not intended to limit the scope of the present disclosure. These novel embodiments can be implemented in various forms other than those described above. Various omissions, substitutions, and changes can be made without departing from the spirit of the present disclosure. These embodiments and modifications of the embodiments are included in the scope and the spirit of the present disclosure and included in the present disclosure described in claims and a scope of equivalents of the present disclosure.

The present disclosure can also be achieved, for example, by causing the CPU to execute a computer program that performs processes shown in FIG. 7.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A viewpoint recommendation apparatus for estimating, from a first viewpoint of an object, a second viewpoint at which the object is to be observed next in order to estimate a pose of the object, the viewpoint recommendation apparatus comprising:
    image acquisition means for acquiring an image of the object at the first viewpoint;
    image feature extraction means for extracting an image feature of the image of the object from the image of the object acquired by the image acquisition means;
    pose estimation means for calculating a first likelihood map indicating a relation between the estimated pose of the object estimated from the image of the object and a likelihood of this estimated pose based on the image feature of the object extracted by the image feature extraction means;
    second storage means for storing a second likelihood map indicating a relation between the true first viewpoint in the estimated pose and a likelihood of this first viewpoint;
    third storage means for storing a third likelihood map indicating a relation between the pose of the object when the object is observed at the first viewpoint and the second viewpoint and a likelihood of this pose; and
    viewpoint estimation means for estimating the second viewpoint so that a value of an evaluation function becomes the maximum or minimum, the evaluation function using, as a parameter, a result of multiplying and integrating the first likelihood map calculated by the pose estimation means, the second likelihood map stored in the second storage means, and the third likelihood map stored in the third storage means.

2. The viewpoint recommendation apparatus according to claim 1, wherein the viewpoint estimation means estimates the second viewpoint $\hat{\delta}_2$ (hat) using a formula below the first likelihood map $p(\xi|I_1)$ estimated by the pose estimation means, the second likelihood map $p(\varphi_1|\xi)$ stored in the second storage means, and the third likelihood map $p(\theta|\delta_2, \varphi_1)$ stored in the third storage means:

$$\hat{\delta}_2 = \mathrm{argmax}_{\delta_2} g(\iint P(\theta|\delta_2, \varnothing_1) p(\varnothing_1|\xi) p(\xi|I_1) d\xi d\varnothing_1)$$

OR $$\hat{\delta}_2 = \mathrm{argmax}_{\delta_2} g(\iint p(\theta|\delta_2, \varnothing_1) p(\varnothing_1|\xi) p(\xi|I_1) d\xi d\varnothing_1) \quad \text{[Formula 5]}$$

in this formula, $\xi$ is the estimated pose of the object, $I_1$ is the image of the object acquired by the image acquisition means at the first viewpoint, $\varphi_1$ is the first viewpoint, $\theta$ is the pose of the object, and $\delta_2$ is the second viewpoint.

3. The viewpoint recommendation apparatus according to claim 1, further comprising first learning means for learning the image feature of each pose of the object, wherein
    the pose estimation means compares the image feature of the object extracted by the image feature extraction means with the image feature of each pose of the object learned by the first learning means to calculate the first likelihood map.

4. The viewpoint recommendation apparatus according to claim 1, wherein
    the second storage means is second learning means which learns a relation between the true first viewpoint in the estimated pose and the likelihood of the true first viewpoint and stores it as the second likelihood map.

5. The viewpoint recommendation apparatus according to claim 1, wherein
    the third storage means is third learning means which learns a relation between the pose of the object when the object is observed at the first viewpoint and the second viewpoint and a likelihood of this pose and stores it as the third likelihood map.

6. The viewpoint recommendation apparatus according to claim 1, wherein
    the evaluation function is a function for calculating a variance of a distribution or a function for calculating an entropy of the distribution.

7. The viewpoint recommendation apparatus according to claim 1, wherein
    the viewpoint estimation means estimates at least one second viewpoint so that the value of the evaluation function becomes greater than or equal to a threshold or less than or equal to the threshold.

8. A recommendation method performed by a viewpoint recommendation apparatus for estimating, from a first viewpoint of an object, a second viewpoint at which the object is to be observed next in order to estimate a pose of the object, the recommendation method comprising:
    acquiring an image of the object at the first viewpoint;
    extracting an image feature of the image of the object from the acquired image of the object;
    calculating a first likelihood map indicating a relation between the estimated pose of the object estimated from the image of the object and a likelihood of this estimated pose based on the extracted image feature of the object; and
    estimating the second viewpoint so that a value of an evaluation function becomes the maximum or minimum, the evaluation function using, as a parameter, a result of multiplying and integrating the calculated first likelihood map, a second likelihood map indicating a relation between the true first viewpoint in the estimated pose and a likelihood of this first viewpoint, and a third likelihood map indicating a relation between the pose of the object when the object is observed at the first viewpoint and the second viewpoint and a likelihood of this pose.

9. A non-transitory computer readable medium storing a program of a viewpoint recommendation apparatus for estimating, from a first viewpoint of an object, a second viewpoint at which the object is to be observed next in order to estimate a pose of the object, the program causing a computer to execute:
   a process of acquiring an image of the object at the first viewpoint;
   a process of extracting an image feature of the image of the object from the acquired image of the object;
   a process of calculating a first likelihood map indicating a relation between the estimated pose of the object estimated from the image of the object and a likelihood of this estimated pose based on the extracted image feature of the object; and
   a process of estimating the second viewpoint so that a value of an evaluation function becomes the maximum or minimum, the evaluation function using, as a parameter, a result of multiplying and integrating the calculated first likelihood map, a second likelihood map indicating a relation between the true first viewpoint in the estimated pose and a likelihood of this first viewpoint, and a third likelihood map indicating a relation between the pose of the object when the object is observed at the first viewpoint and the second viewpoint and a likelihood of this pose.

10. A viewpoint recommendation apparatus for estimating, from a first viewpoint of an object, a second viewpoint at which the object is to be observed next in order to estimate a pose of the object, the viewpoint recommendation apparatus comprising:
   a sensor configured to acquire an image of the object at the first viewpoint;
   an image feature extractor configured to extract an image feature of the image of the object from the image of the object acquired by the sensor;
   a pose estimation unit configured to calculate a first likelihood map indicating a relation between the estimated pose of the object estimated from the image of the object and a likelihood of this estimated pose based on the image feature of the object extracted by the image feature extractor;
   a second storage configured to store a second likelihood map indicating a relation between the true first viewpoint in the estimated pose and a likelihood of this first viewpoint;
   a third storage configured to store a third likelihood map indicating a relation between the pose of the object when the object is observed at the first viewpoint and the second viewpoint and a likelihood of this pose; and
   a viewpoint estimation unit configured to estimate the second viewpoint so that a value of an evaluation function becomes the maximum or minimum, the evaluation function using, as a parameter, a result of multiplying and integrating the first likelihood map calculated by the pose estimation unit, the second likelihood map stored in the second storage, and the third likelihood map stored in the third storage.

* * * * *

UNITED STATES PATENT AND TRADEMARK OFFICE
CERTIFICATE OF CORRECTION

PATENT NO. : 10,909,717 B2
APPLICATION NO. : 16/454735
DATED : February 2, 2021
INVENTOR(S) : Hiroshi Murase et al.

It is certified that error appears in the above-identified patent and that said Letters Patent is hereby corrected as shown below:

In the Specification

In Column 9, Line(s) 67, delete "viewpoint 62" and insert --viewpoint δ2--, therefor.

In Column 10, Line(s) 29, delete "viewpoint 62" and insert --viewpoint δ2--, therefor.

In Column 10, Line(s) 31, delete "viewpoint 91" and insert --viewpoint φ1--, therefor.

In Column 10, Line(s) 31, delete "viewpoint 52" and insert --viewpoint δ2--, therefor.

In Column 10, Line(s) 33, delete "viewpoint 62" and insert --viewpoint δ2--, therefor.

In Column 10, Line(s) 44, delete "viewpoint 62" and insert --viewpoint δ2--, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*